United States Patent [19]

Revells et al.

[11] 4,222,764

[45] Sep. 16, 1980

[54] GLASS SHEET SUPPORTING AND CONVEYING APPARATUS

[75] Inventors: Robert G. Revells; Donald D. Rahrig, both of Toledo, Ohio

[73] Assignee: Libbey-Owens-Ford Company, Toledo, Ohio

[21] Appl. No.: 32,453

[22] Filed: Apr. 23, 1979

[51] Int. Cl.² ............................................ C03B 27/00
[52] U.S. Cl. .............................. 65/348; 65/374 RM; 29/115; 29/116 AD
[58] Field of Search ................. 65/348, 349, 350, 351, 65/374 RM, 118, 27; 29/115, 116 R, 116 AD

[56] References Cited

U.S. PATENT DOCUMENTS 3,801,298  4/1974  Bezombes ........................... 65/351 X
3,806,331  4/1974  Bezombes ........................... 65/348 X
4,028,086  6/1977  Rahrig et al. ....................... 65/351 X Primary Examiner—Arthur D. Kellogg
Attorney, Agent, or Firm—Collins, Oberlin & Darr

[57] ABSTRACT

An apparatus for supporting and conveying thin glass sheets through a tempering area including a series of upper and lower conveyor rolls for continuously advancing heated thin glass sheets between the opposed blastheads of a tempering section. The upper series of rolls are specially configured for accommodating a common drive element for both series of rolls and are mounted for floating movement as well as being individually pivotable into an inoperative, out-of-the-way position to facilitate access into the tempering area for maintenance and cullet removal.

10 Claims, 7 Drawing Figures

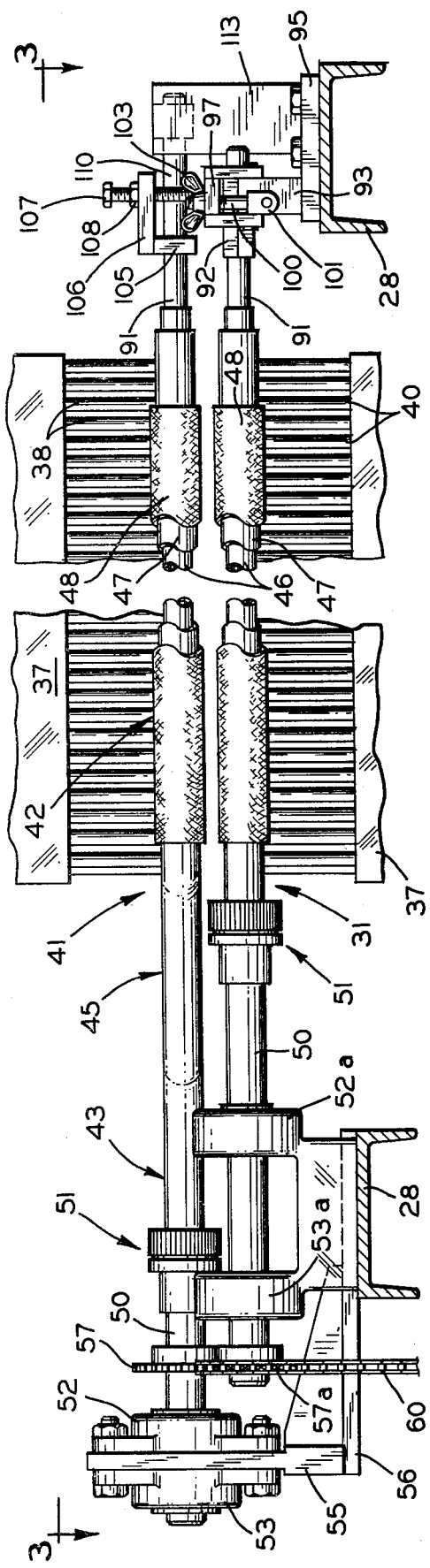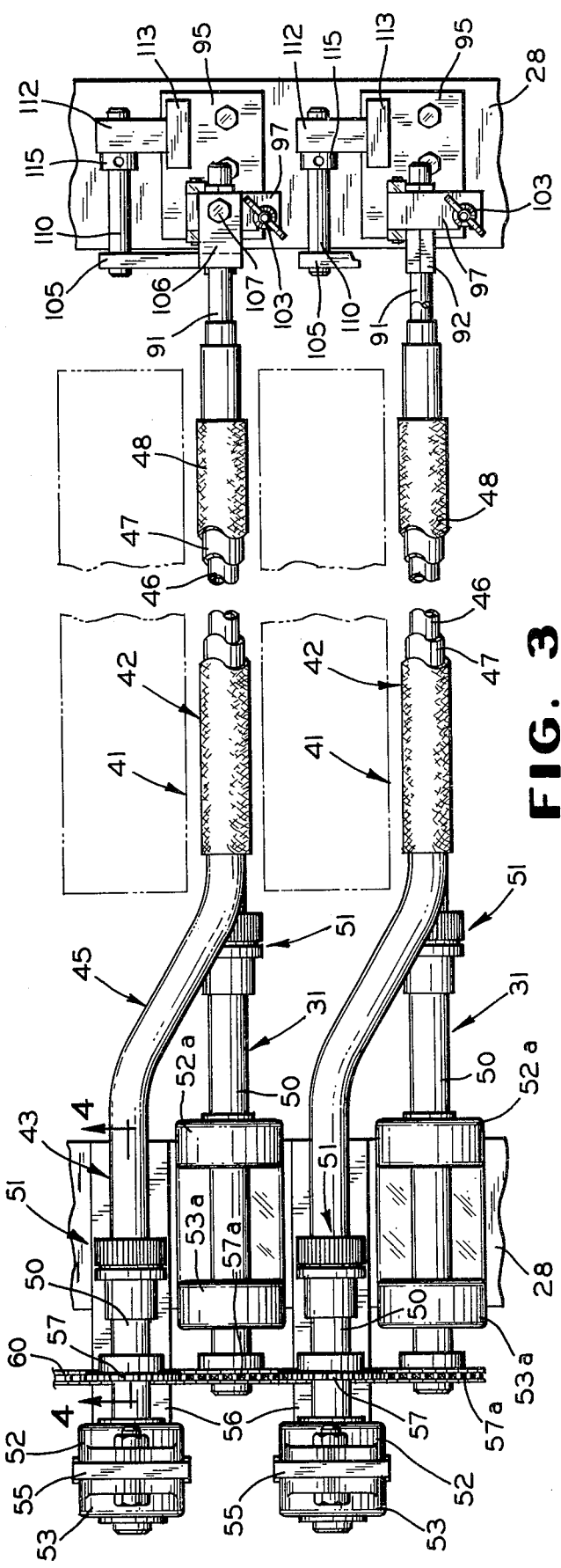
FIG. 2
FIG. 3

GLASS SHEET SUPPORTING AND CONVEYING APPARATUS

BACKGROUND OF THE INVENTION

The present invention relates generally to the tempering of glass sheets and, more particularly, to an improved apparatus for supporting and conveying thin glass sheets through a horizontal tempering station.

In a horizontal flat glass tempering operation, heated flat sheets of glass are successively advanced in a generally horizontal plane along a substantially horizontal path on a series of driven conveyor rolls through opposed blastheads of a chilling or tempering station whereby the opposite surfaces of the heated sheets are flushed with a suitable cooling medium, such as air for example, to rapidly chill the glass sheets and impart the desired temper thereto. The air under pressure is directed in streams by a plurality of opposed nozzles against the opposite glass surfaces. The pressures directed against such opposite surfaces may vary, sometimes being greater against the bottom surface than the top surface and vice versa. The weight and mass of glass sheets of conventional thicknesses are sufficient to maintain the same in engagement with the conveyor rolls so as to be advanced thereby. However, when processing thin glass sheets, i.e. sheets having thicknesses of ⅛ inch and less, there is a tendency for the sheets to float off the rolls with consequent interruption in their advancement and the possibility of damage thereto due to their engagement either with succeeding sheets or with the nozzles of the upper blasthead.

Accordingly, it is desirable to provide a series of upper conveyor rolls in closely spaced vertical relation to the usual lower conveyor rolls within the tempering section to restrain upward movement of the sheets and to assist in their advancement through the tempering section. However, employing a second series of conveyor rolls requires additional drive train components and materially encumbers the drive end area of the rolls, seriously impeding access into the tempering area between the blastheads for maintenance and cullet removal. Also, because of the close vertical spacing between the upper and lower rolls, there is a definite possibility of glass jamming within the tempering section in the event of glass breakage. Any such breakage also tends to back-up and create jamming within the furnace due to the close proximity of the furnace exit end to the tempering section in conventional tempering operations.

SUMMARY OF THE INVENTION

Accordingly, it is a primary object of the present invention to overcome the above shortcomings by providing a new and improved conveyor roll system of the upper-lower type for conveying thin glass sheets between the blastheads of a horizontal flat tempering station.

It is another object of this invention to provide a common drive arrangement for both the upper and lower conveyor rolls mounted in a tempering station.

It is still another object of the present invention to provide each of the foregoing conveyor rolls of the upper series with mounting means permitting floating action thereof and facilitating displacement of the rolls individually into an out-of-the-way position for access into the tempering area.

It is a further object of this invention to provide a conveyor bridge section interposed between the furnace section and the tempering section to avoid glass jamming within the furnace.

These and other objects, advantages, and characterizing features of the present invention will become clearly apparent from the ensuing detailed description of an illustrative embodiment thereof, taken together with the accompanying drawings, wherein like reference numerals denote like parts throughout the various views.

BRIEF DESCRIPTION OF THE DRAWINGS

FIG. 2 is a cross sectional view, on an enlarged scale, taken along the line 2—2 of FIG. 1;

FIG. 3 is a fragmentary, top plan view, looking in the direction of arrows 3—3 of FIG. 2;

DESCRIPTION OF THE PREFERRED EMBODIMENT

Figure 1:
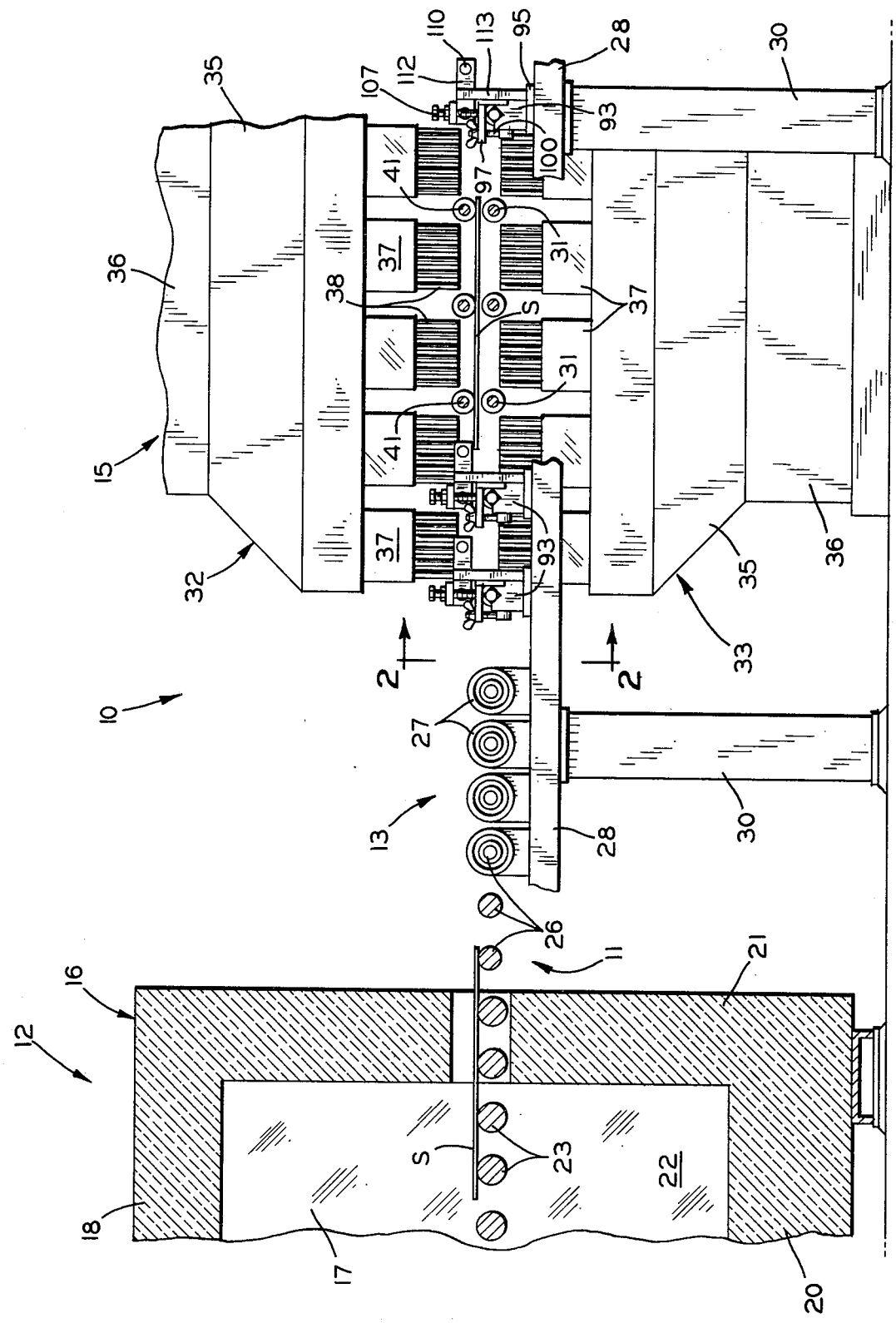
FIG. 1 is a longitudinal, side elevational view, partly in section and with parts broken away, of a tempering apparatus incorporating the novel features of the present invention.

Referring now in detail to the illustrative embodiment depicted in the accompanying drawings, there is shown in FIG. 1 an apparatus, comprehensively designated 10, for tempering a flat glass sheet or a succession of sheets in accordance with the present invention. While not restricted thereto, the tempering apparatus of this invention is especially adapted for use in tempering thin glass sheets, e.g. glass sheets having thicknesses of ⅛ inch or less. Apparatus 10 includes a continuous conveyor system, generally designated 11, adapted to support a plurality of flat glass sheets S in a generally horizontal plane for movement along a continuous, substantially horizontal path through a heating section 12, a conveyor bridge section 13, and a tempering section 15, the above sections being contiguous so that a sheet passes immediately from one section to the next succeeding section.

In the illustrative embodiment, the heating section 12 comprises a tunnel-type furnace 16 having a heating chamber 17 defined by a top wall 18, a bottom wall 20, a rear end wall 21, and opposite side walls 22, all formed of a suitable refractory material. The heating chamber 17 can be heated in any desired manner by a suitable heating means, such as gas fired burners or electrical resistance elements for example (not shown), located in the top, bottom and/or side walls of furnace 16. These burners or electrical heating elements preferably are arranged and controlled to provide heat patterns or zones of progressively increasing temperatures from the entry end to the exit end of furnace 16. The sheets S are advanced through the heating chamber 17 on a series of conveyor rolls 23, which form a part of the conveyor system 11, and are spaced longitudinally within chamber 17 from the entry end (not shown) of the furnace 16 to the oppositely disposed exit end thereof. These conveyor rolls 23 extend transversely across chamber 17 with their opposite ends projecting through the opposite side walls 22 and suitably journalled in bearing blocks (not shown) located exteriorly of and along side walls 22 of the furnace. The sheets S are heated to the proper temperatures for tempering during their passage through chamber 17 and, upon emerging from an opening 25 in the rear end wall 21 of furnace 16, are received on a second series of conveyor rolls 26, also forming a part of conveyor system 11, and which advance the sheets to a tempering section 15.

Rolls 26 extend transversely of the horizontal path of movement of the sheets S with their respective opposite ends suitably journalled in bearing blocks 27 mounted on longitudinally extending rails 28 suitably supported on pedestals or vertical columns 30. The conveyor rolls 26, in essence, constitute the bridge section 13 which is a significant feature of this invention and is lengthened sufficiently to separate the tempering section 15 from the furnace 16 by a long span as opposed to conventional tempering arrangements wherein the tempering section is in close proximity to the exit end of the furnace.

It should be appreciated that heat-softened glass is most vulnerable to breakage after it leaves the furnace and is being chilled, such as occurs in the tempering section. In conventional arrangements, glass breakage in the cluttered tempering section cannot be immediately cleared so that successive advancing sheets accumulate or back-up and jam within the furnace. The provision of a relatively lengthy span between the tempering section 15 and the furnace 16, as in the present invention, offers an elongated open area to facilitate glass removal or spill-over in the event of glass breakage downstream of furnace 16 and thereby avoids jamming of glass within the furnace. Also, blow back of cooling fluid from tempering section 15 through opening 25 into the furnace 16 is virtually eliminated to avoid thermal variations adjacent the exit end of heating chamber 17 and thereby maintain the heated sheets at the requisite temperatures for optimum tempering.

The sheets S are transferred from the conveyor rolls 26 onto a third series of conveyor rolls 31 for movement within the tempering section 15 between an upper and lower blasthead 32 and 33. These upper and lower blastheads 32 and 33 in tempering section 15 are supported on a suitable structural frame (not shown) and each comprises a plenum chamber 35 formed by an enclosure and provided with an inlet 36 at one end thereof and a series of modules or projecting sections 37 at the other end thereof carrying a plurality of downwardly and upwardly directed tubes 38 and 40, respectively, through which chilling air under pressure is directed against the opposite surfaces of the glass sheets as they are carried therebetween. Preferably, the sections 37 are detachably secured to the associated plenum chamber enclosure for selective removal and/or replacement whereby one or more sections can be readily replaced, when necessary, without disturbing the remaining sections.

In practice, it has been found virtually impossible to precisely equalize the pressures of the air streams impinging against the opposite surfaces of the glass sheets being chilled in a horizontal tempering process. This is due in part to the inherent variance in the air pressures emitted from the discharge nozzles or tubes and in part to the turbulence generated in the tempering area between the opposed blastheads. As a result, the pressures acting against the opposite surfaces of the advancing glass sheets vary to some extent with the higher pressure sometimes directed against the upper surfaces of the sheets and at other times against the lower surfaces thereof. This slight pressure disparity normally does not pose any problems when processing sheets of conventional thicknesses, i.e. thicknesses greater than ⅛ of an inch for example, because the weight or mass of the sheets is sufficient to maintain them seated on the conveyor rolls for movement thereby. However, when processing thin glass sheets having thicknesses of ⅛ inch or less, a greater pressure acting on the lower surfaces thereof tends to lift the same off the rolls and cause them to flutter or float in suspension above the rolls with consequent breakage either by their engagement with the tubes of the upper blastheads or, because advancement is temporarily retarded, by collision with succeeding advancing sheets.

In order to overcome this problem, the tempering section 15 is provided with a series of upper transversely extending conveyor rolls 41 in spaced relation to the lower conveyor rolls 31 with the major portions of the upper rolls being in substantial vertical alignment therewith. These upper rolls 41 not only restrain the vertical movement or displacement of the sheet as it advances between the blastheads 32 and 33 when a greater air pressure is applied to the lower surface of the sheet than the upper surface thereof, but also serve to literally convey the sheets which will be urged thereagainst under such conditions.

When utilizing an upper series of conveyor rolls in conjunction with the usual lower series of conveyor rolls, it can be appreciated that the drive arrangement must be substantially duplicated for the additional set of rolls, thereby drastically cluttering the drive end of the tempering area. Moreover, the addition of a second series of rolls within the confines of the tempering area between the blastheads not only seriously impairs access into such area for maintenance and glass particle or cullet removal when necessary, but also, because of the limited spacing between the upper and lower rolls, tends to retard, if not completely interrupt, passage of whole or broken pieces being inadvertently advanced in a superimposed relation.

The present invention addresses itself to these problems by offsetting the drive ends of the upper conveyor rolls enabling both the upper and lower sets of rolls to be driven by a common drive chain. Also, the idle end of each upper conveyor roll 41 is mounted for free floating displacememt and for pivotal movement into an upper, out-of-the-way position providing easy access into the tempering area, when required.

As best shown in FIGS. 2 and 3, each upper conveyor roll 41 is formed with a straight linear portion 42 parallel to and in closely spaced relation to the straight lower conveyor roll 31 and a laterally offset end portion 43 joined to the straight portion 42 by an inclined portion 45. The straight portion 42 of each upper roll 41 is disposed in the same vertical plane as its associated lower roll 31. Since the construction of conveyor rolls 31 and 41 are substantially the same, except for their overall configurations as noted above and the location of their respective bearing blocks as will be hereinafter described, it is believed that a detailed description of only one roll, for example roll 41, will suffice for both, the same reference characters being applied to identical parts.

Figure 4:
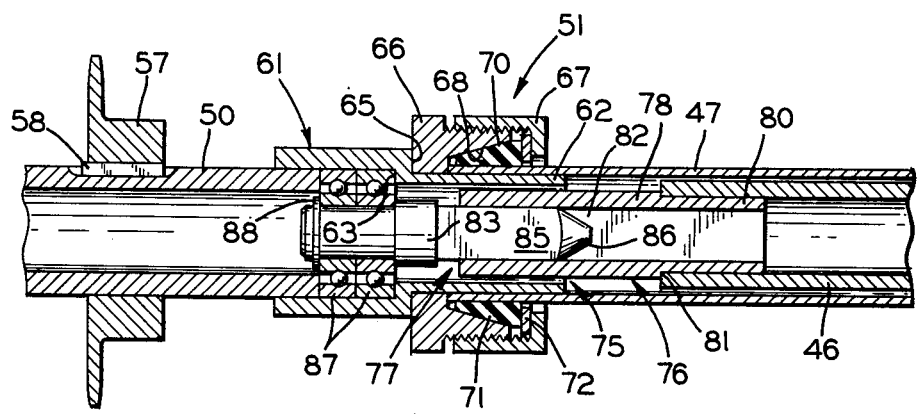
FIG. 4 is a fragmentary, vertical sectional view, on an enlarged scale, taken along line 4—4 of FIG. 3.
Figure 5:
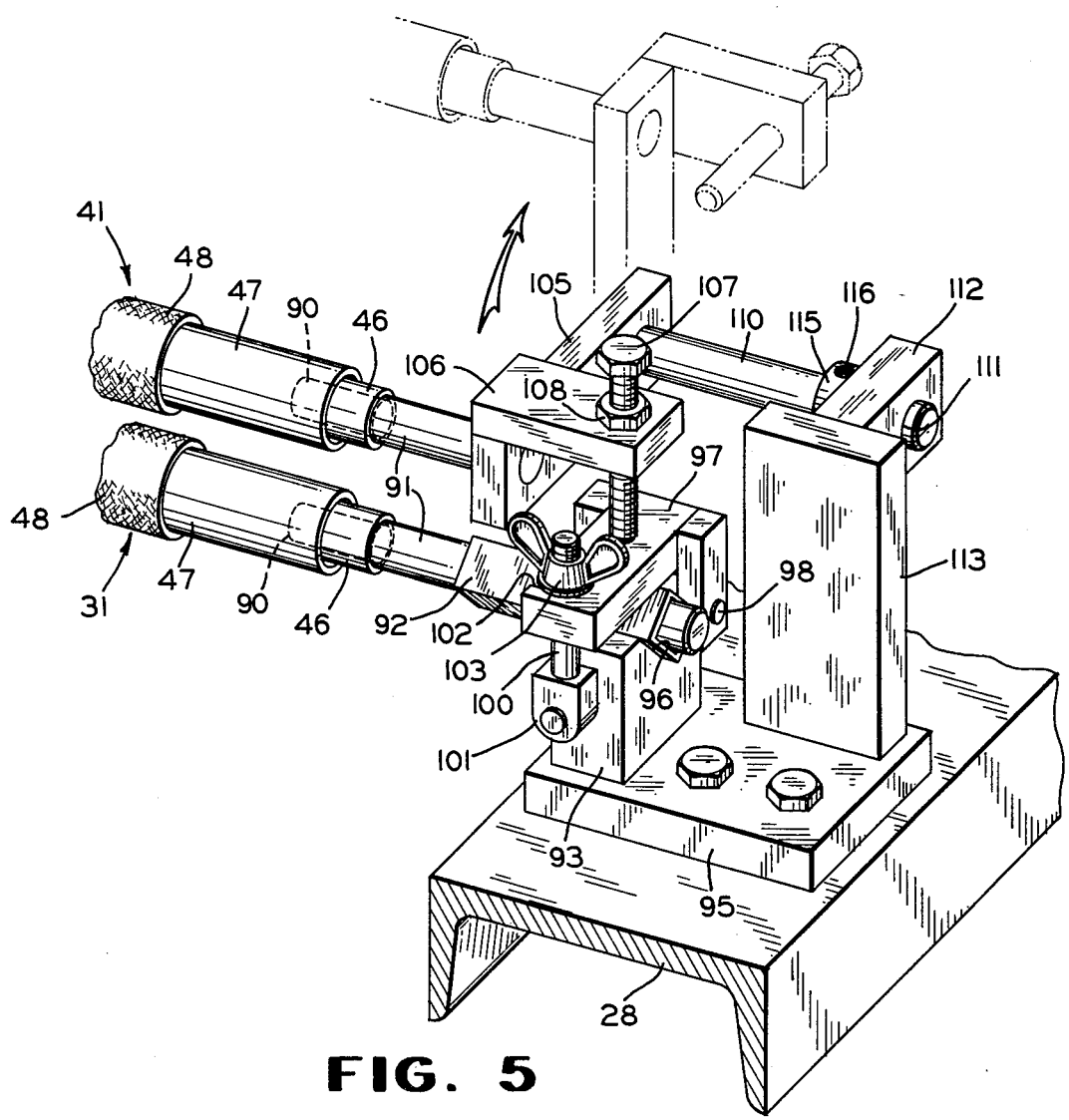
FIG. 5 is a perspective view of the idle end of the vertically spaced conveyor roll arrangement, showing the mountings for each pair of associated conveyor rolls.
Figure 6:
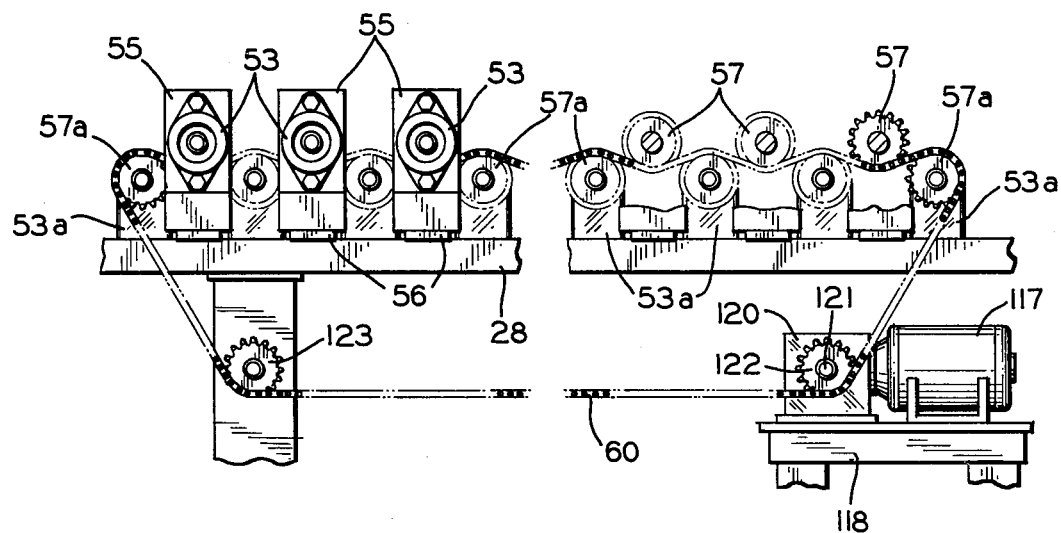
FIG. 6 is a side elevational view of a drive arrangement for the series of upper and lower conveyor rolls mounted in the tempering section.
Figure 7:
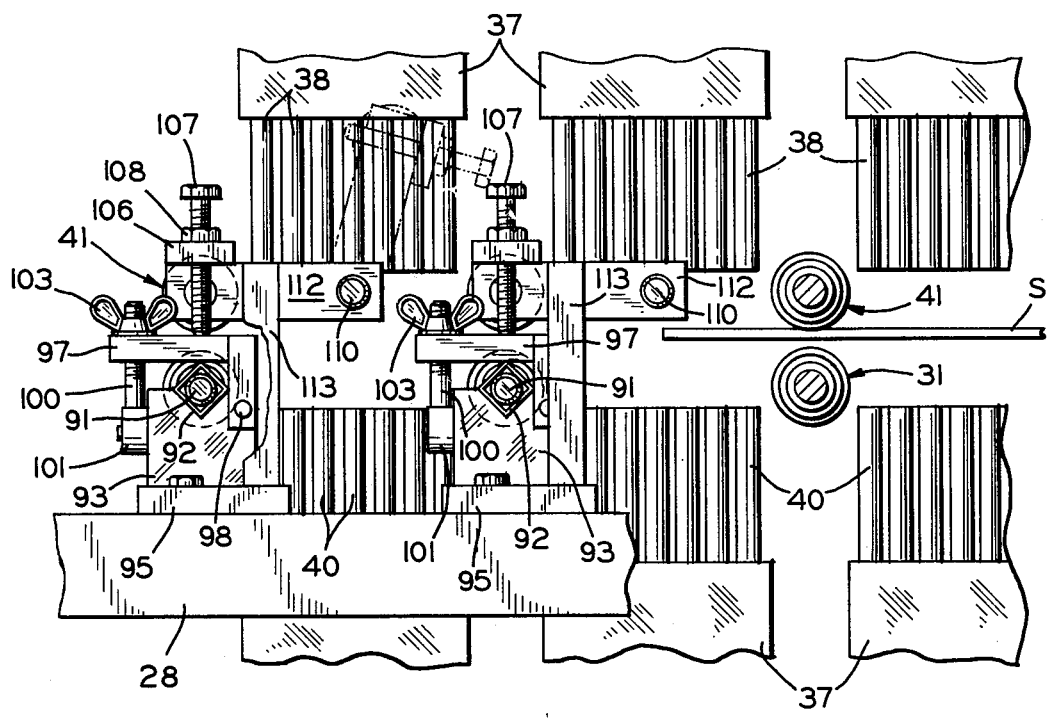
FIG. 7 is a side elevational view of the tempering section, showing the idle end of the conveyor rolls.

Referring now to FIG. 4, each conveyor roll 41 comprises an inner, hollow, flexible, substantially stationary core member 46 and an outer, flexible, load-carrying, rotatable sleeve 47. To facilitate rotation of the outer sleeve 47 about core 46, the former may be comprised of a convoluted liner formed of a suitable anti-friction material, such as fluorocarbon resin for example, covered with a layer of stainless steel mesh to reinforce the same and prevent kinking thereof. While the outer sleeve 47 is flexible for conforming to the arcuate shape of the inner core 46, it is capable of transmitting torque without significant axial twist or distortion. The sleeve 47 can be covered with an asbestos or fiber glass material 48 to provide a resiliently yieldable, heat resistant, non-marring surface upon which the glass sheets are received.

The drive end of the outer sleeve 47 of each conveyor roll 41 is coupled to a rotatable tubular drive member 50 for rotation therewith by a coupling, generally designated 51. The drive member 50 is journalled for rotation in bearings 52 and 53 (FIG. 3) mounted on the vertical leg 55 of an angled support bracket 56 carried on one of the rails 28 along one side of the tempering apparatus and is provided with a pinion 57 rigidly secured to drive member 50 by means of a key 58 (FIG. 4). It is a feature of this invention to locate the pinions 57 of rolls 41 and the pinions 57a of rolls 31 in a common vertical plane and in closely spaced relation in order to be driven by a common drive chain 60 and thereby occupy the minimum amount of space possible. To this end, the drive end of the upper rolls 41 differs from that of the lower rolls 31 in that the drive members 50 of the former project axially beyond the drive member 50 of rolls 31 to mount the bearings 52 and 53 thereof on the very end of the drive member 50 and outwardly of their respective pinions 57. Thus, the bearings 52 and 53 project axially beyond bearings 52a and 53a of the lower rolls 31 to accommodate the associated parts while positioning the respective pinions 57 and 57a of rolls 41 and 31 in a common vertical plane in staggered but closely spaced relation. However, in all other aspects, the rolls 41 are identical in construction to the rolls 31.

Referring again to FIG. 4, each coupling 51 is mounted on a tubular drive extension 61 secured to drive member 50 as by suitable set screws (not shown) for rotation therewith. The tubular drive extension 61 is formed with a reduced diameter portion 62 defining inner and outer annular shoulders 63 and 65. The reduced diameter portion 62 is telescopically received in the complementary shaped end portion of sleeve member 47. Coupling 51 also includes an externally threaded male member 66 seated against shoulder 65 and adapted to receive an internally threaded female connector member 67 disposed about the sleeve member 47 for attaching the latter to tubular extension 62.

Internal wall surface 68 of male member 66 is tapered inwardly to engage the outer, conically shaped, complemental surface 70 of a gripping sleeve 71 having a bore for receiving the sleeve member 47 therethrough. The gripping sleeve 71 is formed of rubber of any other suitable resiliently yieldable, elastomeric material and when compressed radially, exerts a radial clamping force on the sleeve member 47. The rear end of gripping sleeve 71 is flat and bears against a washer 72 interposed between gripping sleeve 71 and the rear end wall of female connector member 67.

It is sometimes only necessary to replace the core member 46 of a damaged conveyor roll rather than the entire composite roll assembly. In order to facilitate conveyor roll core removal and replacement, each core member 46 adjacent the drive end of the roll is provided with a quick connect-disconnect coupling assembly, generally designated 75 (FIG. 4). Such an assembly 75 includes the tubular drive extension 61 which serves as a casing or housing for the composite two-piece assembly including a first coupling section 76 secured to one end of each inner core member 46 and a second coupling section 77 mounted within the tubular drive extension 61 which rotates relative to the coupling section 77. Coupling section 76 comprises a cylindrical body 78 having a reduced diameter portion 80 separated by an annular shoulder 81. This reduced diameter portion 80 is press fitted or otherwise fixedly secured within the bore of core member 48 with shoulder 81 abutting against the end face of core member 46. Coupling section 76 is provided with a socket in the form of a bore 82 of square or flat sided configuration extending therethrough for receiving a complementary shaped male member of the other section 77, as will presently become apparent.

Coupling section 77 comprises an elongated body 83 mounted in the tubular drive extension 61 and includes a flat sided lug 85 of substantially square cross sectional configuration adapted to fit into the complementary shaped socket or bore 82 of coupling section 76. The forward end of lug 85 is tapered, as shown in 86, to facilitate insertion thereof into the socket 82. A pair of abutting bearings 87 are mounted on a reduced diameter portion of body 83 to permit rotary movement of the tubular drive extension 61 relative to coupling section 77. A suitable retaining ring 88 holds the bearings 87 in place. The bearings also are fixed in position between annular shoulder 63 and the end face of drive member 50.

The idle end of each core member 46 remote from drive member 50 receives the reduced diameter portion 90 of a stub shaft 91. The stub shaft 91 of each lower conveyor roll 31 is provided with a sleeve 92 of generally square configuration in cross section secured in an upright mounting block 93 affixed to a base plate 95 supported on the other rail 28 extending longitudinally along the other side of the tempering section 15. The bracket 93 is formed at its upper end with a V-shaped groove 96 for receiving the complementary shaped sleeve 92 of stub shaft 91. The stub shaft 91 is held in place by means of an inverted L-shaped clamping bracket 97 mounted for pivotal movement about a horizontally extending pivot pin 98 mounted on the block 93. The bracket 97 is held in a clamping position about the sleeve 92 by means of a threaded stud 100 secured at its lower end to pivotal lug 101 mounted on the block 93 and adapted to be swung into an upright position for reception in a U-shaped groove 102 formed in the upper horizontally extending portion of bracket 97. A wing nut 103 is threaded onto the free end of stud 100 for clamping the bracket 97 against the sleeve 92 of stub shaft 91 to secure the same in place.

The stub shaft 91 of each of the upper conveyor rolls 41 is fixedly secured within one end of a horizontally extending plate 105 having a right angularly related bracket 106 rigidly secured to the upper edge thereof. The bracket 106 is formed with an opening therethrough for receiving a screw 107 threaded through a nut 108 fixedly secured to the upper surface of the bracket 106. The lower end of screw 107 rests on the horizontal portion of bracket 97 and can be turned in either direction within nut 108 to selectively adjust the vertical spacing of upper roll 41 from the lower roll 31. The other end of the plate 105 is rigidly secured to a shaft 110 journalled for rotation within a suitable aperture 111 formed in a block 112 projecting laterally from an upstanding support 113, in turn rigidly secured at its lower end to the base plate 95. A collar 115 is suitably mounted on the shaft 110, as by means of a set screw 116, to prevent axial outward movement of the shaft 110 through aperture 111. Thus, the idle end of the upper conveyor roll 41 is mounted, as by the above described arrangement, for pivotal movement about a common pivot axis defined by the axis of roll 41 adjacent its drive end and the axis of rotatable shaft 110 between a lower operative position in closely spaced relation to the lower conveyor roll 31 and an upper, inoperative, out-of-the-way position for easy access into the tempering area. In its lower operative position, the support structure for the upper conveyor roll 41 merely rests by gravity via screw 107 on the bracket 97. Screw 107 can be turned in either direction to vary the spacing of the upper roll 41 from its associated lower roll 31 as required or dictated by the thickness of the glass being processed.

The non-fixedly, floating mounting arrangement for the idle end of the upper conveyor roll 41 is an important feature of this invention in that such rolls are freely displaceable upon engagement by inadvertently loaded, superimposed glass sheets or layered pieces of fragmented glass to preclude glass blockage in the tempering area. Also, any one or several of the rolls 41 can be manually swung upwardly into an out-of-the-way position to facilitate access into the tempering area for apparatus maintenance and for cullet removal when necessary. Moreover, the spacing between the upper roll 41 and its associated lower roll 31 can be readily adjusted by merely turning the respective screw 107 in the proper direction without having to remove the roll from its mounting or disassembling other components otherwise required with conventional conveyor roll systems.

The means for driving the upper and lower series of conveyor rolls 31 and 41 includes a motor 117 mounted on a suitable platform 118 and operatively connected, through a gear reduction mechanism 120, to an output shaft 121 having a drive sprocket 122 rigidly secured thereon. The endless drive chain 60 is entrained about drive sprocket 122, an idler sprocket 123 and alternatively about the several pinions 57a and 57 of conveyor rolls 31 and 41, respectively, for rotating them in unison in opposite rotary directions. As a result of curving the drive end of the upper conveyor rolls 41 so as to laterally offset the same from the straight portions 42 thereof while maintaining them in the same horizontal plane, the associated pinions 57 are located in closely spaced relation to the pinions 57a of the lower conveyor rolls 31, enabling both sets to be driven by the common drive chain 60. This significantly reduces the space occupied by such pinions 57 and 57a and associated hardware, leaving a larger open area for access into the tempering area at the drive end of the several conveyor rolls.

In operation, flat glass sheets S are loaded onto conveyor rolls 23 at the entrance end (not shown) of furnace 16 for movement through the heating chamber 17, wherein the sheets are progressively heated from room temperature to the temperature necessary for proper tempering. Each heated sheet passes through the exit opening 25 and is transferred onto the conveyor rolls 26 of the bridge section 13 and then transferred onto the lower conveyor rolls 31 of tempering section 15 for passage between the upper and lower blastheads 32 and 33. A plurality of streams of cooling air are directed through the blasthead tubes 38 and 40 against the opposite surfaces of the sheets advancing therebetween to rapidly cool and thereby temper the glass sheets. Whenever the force of the air pressure acting against the bottom surface of a sheet is greater than the combined force of the air pressure acting against the upper surface of such sheet and the weight of the latter, the glass sheet will be lifted upwardly off the lower conveyor rolls 31 and urged upwardly against the upper conveyor rolls 41, which then become effective to convey the sheet through the blastheads. However, this greater upward force would rarely be sufficient to overcome the force of the weight of the floating rolls to displace them so that the rolls 41 remain in their normal horizontal plane in closely spaced relation to the lower rolls 31. As a result, the glass sheet tends to walk along or be conveyed by the upper series of conveyor rolls 41 as long as such aforementioned pressure differential exists. In any event, the glass sheet is continuously advanced by either the lower series of rolls 31 or the upper series of rolls 41 through the tempering section 15 regardless of which surface the greater air pressure is acting. The spacing between the upper and lower series of rolls 31 and 41 is sufficient to accommodate the thickness of the sheet plus a slight clearance, say about 0.060 of an inch for example, between the rolls and the glass surface. This clearance is maintained at a minimum to limit the extent of vertical displacement of the glass sheet against either the upper or lower set of rolls and thereby avoid any distortion or damage that would otherwise be incurred by such sheet displacement. As earlier noted, the upper rolls 41 normally would not be displaced upon engagement thereof by a single sheet. In fact, because of their generally stable position under normal conditions, the rolls 41 serve as a barrier, preventing excessive warpage that otherwise might occur as a result of any differential cooling of the sheet. However, when the upper rolls 41 encounter an abnormal force, such as might be caused by a pair of superimposed sheets inadvertently being admitted into the tempering section or upon glass breakage that results in stacked fragmented pieces, the rolls 41 would yield to permit passage of the glass therebeneath and thereby preclude blockage or jamming within the tempering section. Upon leaving the tempering section 13, the sheet is received on still another series of conveyor rolls (not shown) which advance the tempered sheet through the usual cooling station (also not shown) to further reduce the temperature of the sheet to room temperatures for handling.

From the foregoing, it is apparent that the objects of the present invention have been fully accomplished. As a result of this invention, an improved conveyor system comprised of an upper and lower series of conveyor rolls is provided for assuring continuous advancement of thin glass sheets between the opposed blastheads of a horizontal tempering section regardless of the pressure differential acting against the opposite surfaces of the thin sheets. The upper series of rolls are specially configurated in a manner enabling both series of rolls to be rotated in unison in opposite directions by a common drive element. Also, the upper series of rolls are freely mounted for individual floating action during operation and for pivotal movement into an out-of-the-way position to facilitate access into the tempering area for maintenance and cullet removal.

It is to be understood that the form of the invention herewith shown and described is to be taken as an illustrative embodiment of the same, and that various changes in the shape, size and arrangement of parts may be resorted to without departing from the spirit of the invention.

We claim:

1. Apparatus for supporting and conveying glass sheets through a horizontal tempering section comprising: a frame, a plurality of lower rotatable conveyor rolls mounted on said frame, a plurality of upper rotatable conveyor rolls mounted on said frame, each of said upper rolls comprising a generally horizontally extending central portion in substantial parallelism with said lower rolls but spaced thereabove a distance slightly greater than the thickness of the glass sheets to be conveyed thereby so that said advancing sheet normally contacts only said lower rolls or said upper roll central portions at any given time during its passage therebetween, and means supporting said upper rolls for free pivotal movement relative to said lower rolls.

2. Apparatus according to claim 1, wherein each of said upper rolls is formed at one end thereof with a core member provided with an axially projecting shaft and said supporting means includes a pivotal bracket rigidly secured at one end thereof to said shaft and normally freely resting on the fixed mounting of an associated lower roll.

3. Apparatus according to claim 2, wherein said bracket is secured at the other end thereof to a rotatable shaft for free pivotal movement therewith.

4. Apparatus according to claim 2, including means individually adjusting the spacing between the central portion of an upper roll and an associated lower roll.

5. Apparatus according to claim 4, wherein said adjusting means comprises a screw mounted on said pivotal bracket is bearing engagement against said lower roll mounting.

6. Apparatus according to claim 1, wherein each of said upper rolls includes an end portion in the same horizontal plane as said central portion but laterally offset therefrom, and means including a common drive element engageable with portions of both said upper and lower rolls to rotate the same in unison in opposite directions, respectively.

7. Apparatus according to claim 1, wherein each of said upper and lower rolls comprises a fixed core and a rotatable sleeve surrounding said core and operatively connected at one end thereof to a driven tubular member having a sprocket thereon, and said common drive element comprises an endless drive chain entrained about all of said sprockets.

8. Apparatus according to claim 1, wherein each of said upper and lower rolls comprises a fixed core and a rotatable sleeve surrounding said core and operatively connected at one end thereof to a driven tubular member having a sprocket thereon, drive means including a common drive chain entrained about all of said sprockets, each of said upper rolls having an end portion at said one end in the same horizontal plane as said central portion but laterally offset therefrom, the other end of each upper roll having a stub shaft projecting outwardly from the core thereof, and said supporting means including a pivotal bracket secured to said stub shaft and normally freely resting on the fixed mounting of an associated lower roll.

9. Apparatus according to claim 1, in combination with a furnace for heating said sheets, a tempering section downstream of said furnace for chilling said sheets and in which said upper and lower conveyor rolls are mounted, and an elongated conveyor means interposed between said furnace and said tempering section to convey said glass sheets from said furnace to said tempering section through an extended open area.

10. The combination according to claim 9, wherein said conveyor means comprises a plurality of longitudinally spaced conveyor rolls lying in a common plane with the lower conveyor rolls in said tempering section.

* * * * *